United States Patent

[11] 3,587,447

| [72] | Inventor | Dennis J Larkin<br>1838 Orleans, Chicago, Ill. 60604 |
|---|---|---|
| [21] | Appl. No. | 777,063 |
| [22] | Filed | Nov. 19, 1968 |
| [45] | Patented | June 28, 1971 |

[54] COOKING UTENSIL
9 Claims, 5 Drawing Figs.

[52] U.S. Cl. .................................................. 99/425,
99/375, 99/400
[51] Int. Cl. ...................................................... A47j 36/16
[50] Field of Search.......................................... 99/425,
444—446—447, 375, 400—403, 408, 422, 171;
126/51; 220/63, 94; 229/3.5 (M.F.)

[56] References Cited
UNITED STATES PATENTS

| D133,936 | 9/1942 | Barnsteiner | (220/94UX) |
| 1,874,807 | 8/1932 | Rudolph | (99/447UX) |
| 1,998,797 | 4/1935 | Weinberger | (99/403UX) |
| 2,088,848 | 8/1937 | Fay | 220/94X |
| 2,849,949 | 9/1958 | Trachtman | 99/425 |
| 2,875,683 | 3/1959 | Burns | 99/425 |
| 3,047,188 | 7/1962 | Durbin | 220/63 |

Primary Examiner—Walter A. Scheel
Assistant Examiner—Arthur O. Henderson
Attorney—Anderson, Luedeka, Fitch, Even and Tabin ABSTRACT: To obtain a tight fit between a disposable liner of metallic foil, plastic or other material and a cooking pan, a cover for the pan is formed to function as a male die for insertion, when inverted, into the pan to force the liner tightly against the pan.

PATENTED JUN 28 1971 3,587,447

INVENTOR
DENNIS J. LARKIN

Anderson, Luedeka, Fitch, Even & Tabin
ATTYS.

COOKING UTENSIL

This invention relates to a cooking utensil and, more particularly, to a covered cooking utensil for use with an expendable liner of a metallic foil, thin plastic or other material.

The use of expendable liners to line a cooking pan has been recognized as being advantageous either in the home or in a commercial installation, such as a restaurant, in that liners may be used for each of several subsequent food servings or several different foods without an intervening washing of the pan. For many foods, the liner will protect the sides and bottom of the pan from being coated with grease or from particles which necessitate a washing of the pan before it may be reused. Even if a limited amount of food or residue thereof passes the liner to the pan, the limited amount of the food reaching the pan permits a quicker and easier washing of the pan than possible if no liner is used.

In order to achieve good cooking, it has been recognized that the liners must fit intimately and tightly with the bottom of the pan and, preferably, also with the sidewalls of the pan. The tight, intimate fit between the liner and the pan avoids the development of pockets of air and consequent uneven heat transfer to the food as, for example, hot spots which may result in a nonuniform cooking or burning of portions of the food. Preferably, the liner is substantially wrinkle-free along the bottom of the pan as food tends to enter the wrinkles and cling to the liner. Attempts have been made to obtain the necessary tight fit between the pan and the liner by means of a vacuum system in which air was exhausted between the liner and the bottom of the pan so that the ambient air pressure would force and hold the liner against the wall of the pan. As such vacuum systems are not now available at cooking stations in most homes or restaurants, the installation and maintenance of a vacuum system results in a relatively expensive and cumbersome cooking system.

Accordingly, an object of the present invention is to provide a new and improved, as contrasted with the prior art, cooking utensil for use with expendable liners.

Other objects and advantages of the invention will become apparent from the detailed description taken in connection wit the accompanying drawings in which.

Figure 2:
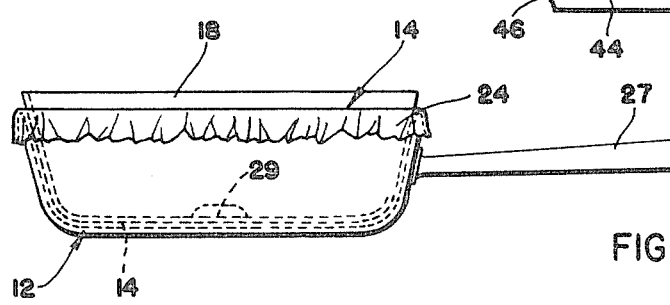
FIG. 2 is a view of the cooking utensil of FIG. 1 with a cover telescoped into the pan and forcing the expendable liner tightly against the bottom of the pan.

As shown in the drawings for purposes of illustration, the invention is embodied in a cooking utensil 11 which includes a pan 12 for receiving an expendable liner 14 made from a flat sheet of material such as, for example, a thin metal foil for covering the interior surface 15 of the pan and for receiving the food to be cooked in the pan. In order to press the liner tightly against a bottom wall 17 of the pan, a cover 18 for the pan is suitably sized and shaped to serve as a male die for inserting into the pan, as illustrated in FIG. 2, and for forcing the liner 14 into a tight intimate contact with at least the bottom wall 17 of the pan. As will be explained in greater detail, the cover 18 is provided with a noninterfering kind of handle means such as, for example, a recessed handle 19, which is disposed beneath the plane of a top wall 20 of the cover 18. The noninterfering handle means is used to lift the cover from the pan, but it will not interfere with projecting the top wall 20 into close and parallel relationship with the bottom wall 17 of the pan.

As will be explained in greater detail, it is preferred that the cover have a size, configuration and a depending sidewall 23 inclined to the horizontal which, when the cover is inverted, is complementary to the interior surface of the pan including its upstanding sidewall 21. Thus, the liner 14 may be forced into a relatively tight fit with the interior surface of the upstanding sidewall 21 of the pan as well as its bottom wall 17. To provide a neat appearance, means may be provided on the rims of the pan and cover to facilitate trimming of the excess 24 of the liner along a rim 25 of the pan.

Referring now in greater detail to the cooking utensil 11, the pan is usually made of metal with a bottom wall which is substantially flat and horizontal and which has an upstanding pan sidewall 21 integrally attached thereto at a rounded corner. The pan sidewall tapers upwardly and outwardly from the bottom wall 17. A suitable handle 27 may be fixed to the outside of the pan sidewall 21. The shape and type of handle for the pan may vary considerably depending upon the use of the pan as a frying or a baking pan or for esthetic reasons.

Since the cover 12 is used as a male die to press the liner 14 against the pan interior surface 15, the cover top wall 18 is substantially of the same shape and size as the bottom wall 17, except that it is slightly smaller in diameter. That is, the top wall 20 is substantially flat and horizontal except for the location of the handle 19. Thus, the central portion of the liner 14 may be forced flat and tightly against the bottom wall when the cover is inverted and inserted into the pan.

In this instance, the handle 19 is disposed generally centrally of the top cover wall 20 and is disposed within a recess formed by a wall 29 which projects inwardly into the interior of the cover from the plane of the cover top wall 20. The recess wall 29 has rounded sides and a flat bottom to which the lower end of the handle 19 may be attached. An annular space 30 exists between the handle 19 and the recess wall 29 to allow insertion of the fingertips to grip the handle.

When the cover 18 is nested in the pan, as illustrated in FIG. 2, the recess wall 29 is exposed and provides a means to grip when pulling the cover from its nested relationship inside the pan. It will be appreciated that the handle means may be in other forms which will not interfere with the pressing of the liner 14 tightly against at least the pan bottom wall 17. For example, the handle may be spring-urged outwardly above the top wall 20 of the cover 18 for gripping at position above the plane of the cover top wall. However, when the cover 18 is telescoped in the pan and sufficient force is exerted to compress the biasing spring (not shown), the handle will be forced to move to a noninterfering position inside a suitable recess wall.

Figure 1:
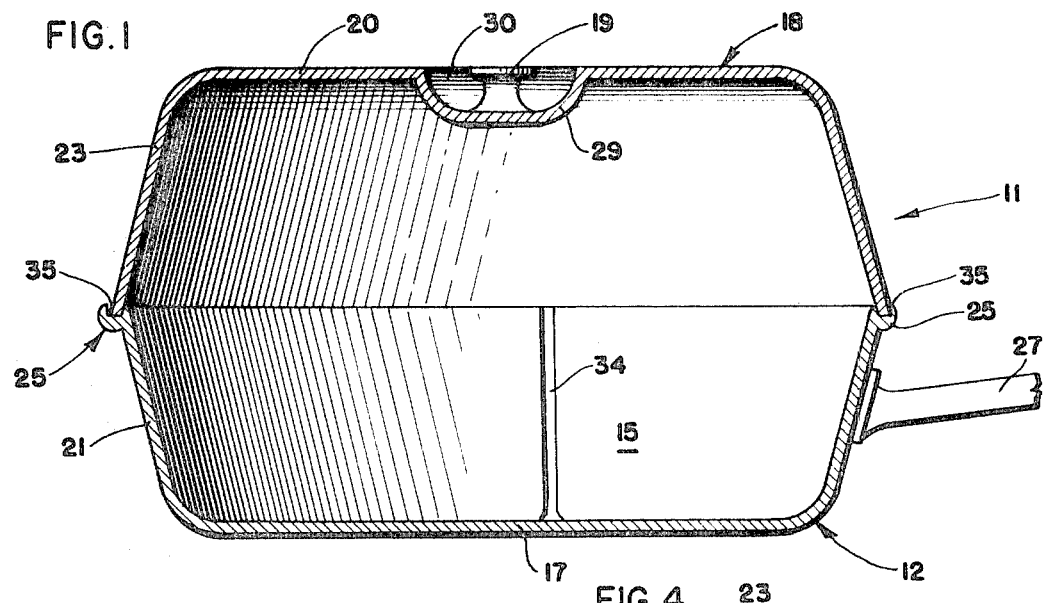
FIG. 1 is a cross-sectional view of a cooking utensil embodying the invention.

In this instance, the depending sidewalls 23 of the cover 18 are integral with the top wall 20 and are disposed at an angle to the horizontal which is at substantially the same angle as the upstanding walls 21 of the cover. The cover wall 23 is just slightly smaller in dimensions than the interior of the pan wall so as to provide the necessary clearance for the type of liner being used. If desired, some upwardly extending grooves 34 (FIG. 1) may be formed in the sidewalls 21 of the pan to allow air to vent and escape from the bottom of the pan during the telescoping of the cover and liner into the pan.

Figure 5:
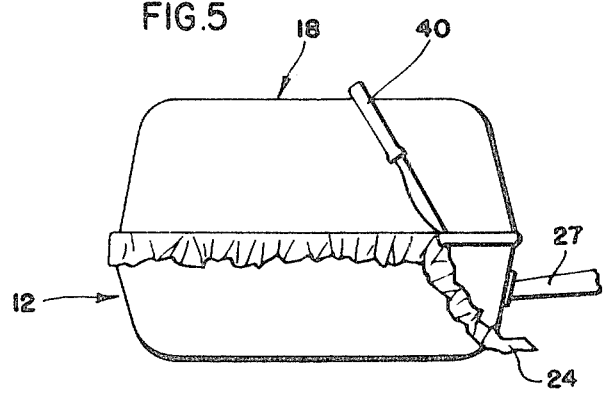
FIG. 5 is a perspective view of the cooking utensil of FIG. 1 with an excess of the liner being trimmed therefrom.
Figure 3:
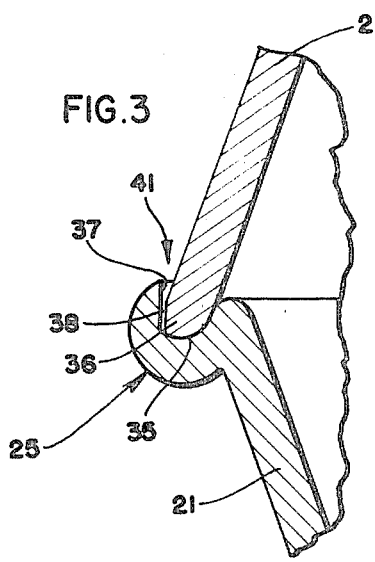
FIG. 3 is an enlarged, fragmentary view of cooperating shearing edges for the rim of the cover and pan.

When using flat, rectangular sheets of ordinary metallic foil or plastic for the liner 14, usually the material excess 24 extends outwardly about and around the pan rim 25, and this excess may be removed in several manners. One manner of removing the excess 24 is to form a shearing means on the rim of the cover and pan, respectively. In this instance, the pan rim 25 is formed with a generally annular groove 35 to seat a lower rounded corner 36, and the shearing action is accomplished by a substantially straight vertical cutting edge 37 on the pan rim 25 and a substantially straight vertical cutting edge 38 on the rim of the cover. These edges 37 and 38 are spaced and related to each other to provide a slight clearance during the shearing action as the rounded corner 36 enters the groove 35. When the liner 14 is formed from a relatively tough or difficult to shear material, a knife 40 may be inserted into the groove 41 (FIG. 3) and run about the cover while trimming the excess 24, as illustrated in FIG. 5.

Figure 4:
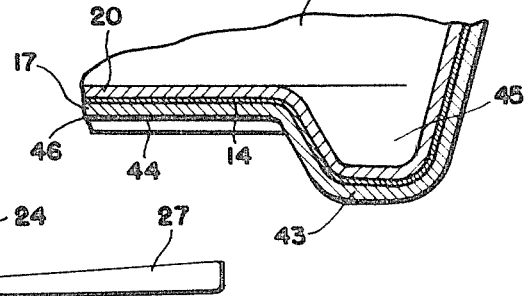
FIG. 4 is a fragmentary, enlarged sectional view of a grease trap recess which may be formed in the pan of FIG. 1.

It may be desired to provide a grease cup 43 (FIG 4) and drainage grooves 44 leading thereto in the bottom 17 of the pan so that grease or liquids may be collected therein. In such an event, the cover 18 is also formed with complementary and mating projections 45 and ridges 46 for forcing the liner 14 downwardly to form a depression to serve as a grease trap.

When using the cooking utensil 11, the preferred manner of applying the liner 14 is to take a sheet of thin plastic or metallic foil and apply the same generally about the outer surface of the cover 18. Then the cover is inverted and telescoped into the pan 12, much in the manner illustrated in FIG. 2; and the cover is forced rather firmly down so that the foil, particularly along the bottom wall 17 of the pan, is in tight, intimate contact with the pan wall 17. The excess material along the rim of the cover is then bent downwardly about and brought into contact with the outer surface of the upper rim of the pan, as illustrated in FIG. 2. This helps attach the liner to the pan during the stripping of the liner from the cover when the latter is lifted from its nested position in the pan, as illustrated in FIG. 2. The cover may be gripped along its rim, which is now uppermost, and also at the center recess wall 29 when lifting the cover 18 from the liner 14 and the pan 12. The cover functions as a male die to force the liner into flat, tight and intimate contact with the bottom of the pan. The portion of the liner along the bottom of the pan is free of large wrinkles which would cause the food to adhere thereto.

The pan 12 is now lined and ready for use, but to make a neater appearance, the cover 18 may be reverted to have the handle 19 up and placed on the pan. Where the rims of the cover and pan are formed with the shearing edges 37 and 38, the liner may be severed from the excess material 24 automatically by these shearing edges. If the liner does not cut or does not sever cleanly, the knife 40 may be inserted into the groove 41 to finish trimming the excess of the liner.

From the foregoing, it will be seen that liners may be easily and quickly formed and pressed into tight, intimate contact with the walls of the pan without the use of cumbersome vacuum systems. The sizing and using of the cover to serve, when inverted, as a male die to press a liner into the desired tight, intimate contact with the walls of the pan, particularly the bottom wall thereof, eliminates the need for other apparatus to accomplish this task. The handle for the cover is made in a manner to eliminate any interference by the handle when the cover is inverted and used as the male die. The pan and cover are preferably formed with rims which facilitate the cutting or trimming of any excess liner projecting outwardly from the engaged cover and pan rims.

While a preferred embodiment has been shown and described, it will be understood that there is no intent to limit the invention by such disclosure but, rather, it is intended to cover all modifications and alternate constructions falling within the spirit and scope of the invention as defined in the appended claims.

I claim:

1. A cooking utensil for use with a disposable liner for receiving food comprising a pan having a bottom wall, an upstanding sidewall connected to said bottom wall and terminating in a rim, a cover having a top wall, a depending wall attached to said top wall and depending therefrom to a rim which fits with said pan rim to support said cover on said pan, said top wall of said cover being configured substantially similar to at least a portion of said bottom wall for forcing a disposable liner tightly against said bottom wall, said depending wall being sufficiently smaller than said upstanding pan wall to project therein when said cover is inverted, and means on said cover defining a handle for lifting said cover from said pan, said handle means being noninterfering with said walls of said pan during inversion and insertion of said cover into the pan to allow said cover top wall to press the liner tightly against said bottom wall.

2. A cooking utensil in accordance with claim 1 in which said top cover wall is formed with a recess and in which said handle is seated in said recess when the cover top wall is pressing a disposable liner tightly against said pan bottom wall.

3. A cooking utensil in accordance with claim 2 in which said depending wall of said cover has a lower portion which is substantially complementary in size to said pan sidewall and is at substantially the same angle to the horizontal as said pan sidewall so that said cover wall portion will press a disposable liner tightly against said pan sidewall when said cover top wall is pressing the liner against said pan bottom wall.

4. A cooking utensil in accordance with claim 1 in which said rims of said pan and cover have cooperating shearing edges for shearing any excess of the disposable liner from protruding outwardly of said rims.

5. A cooking utensil in accordance with claim 1 in which said cover has means on the inside of the cover for gripping to facilitate retraction of the cover from the interior of said pan.

6. A cooking utensil in accordance with claim 1 in which said pan bottom wall is formed with a recess and in which said cover is formed with an upwardly extending projection for, upon inversion of said cover, insertion into said recess to press a disposable liner into said recess to form a grease trap.

7. A cooking utensil for use with a disposable liner comprising a pan having a substantially flat bottom wall, a sidewall connected to said bottom wall and terminating in an upper rim, a cover for said pan having a substantially flat horizontal top wall, a depending wall attached to said cover top wall and flaring outwardly and downwardly from said top wall, said depending wall terminating in a rim to engage the rim of said pan, said depending wall being substantially parallel to said upstanding pan wall when said cover is inverted and inserted into said pan to press a disposable liner tightly against said walls of said pan, and handle means on said cover for lifting said cover from said pan and being noninterfering with said inversion and insertion of said cover into said pan.

8. A cooking utensil in accordance with claim 7 in which said cover top wall is formed with a recess and in which said handle means includes a handle disposed in said recess and below a horizontal plane along the top of the cover whereby the handle does not interfere with the pressing of the liner against the pan bottom wall.

9. A cooking utensil for use with a disposable liner foil comprising a pan having a substantially flat bottom wall, a sidewall connected to said bottom wall and terminating in an upper rim, said sidewall being inclined upwardly and outwardly from said bottom wall, a cover for said pan having a substantially flat horizontal top wall, a depending wall attached to said cover top wall and flaring outwardly and downwardly from said top wall, said depending wall terminating in a rim to engage the rim of said pan, said depending wall being substantially parallel to said upstanding pan wall when said cover is inverted and inserted into said pan, said depending wall of said inverted cover having a surface spaced from said pan sidewall by substantially the thickness of a foil for pressing a foil inserted therebetween into tight intimate contact wit said pan sidewall while said top cover wall forces the foil tightly against said bottom wall of said pan, said cover having a portion thereof for grasping and by which the cover may be pushed towards said pan to force said foil against said pan walls and, thereafter, for lifting said cover from said inverted position within said pan.